Figure 1:
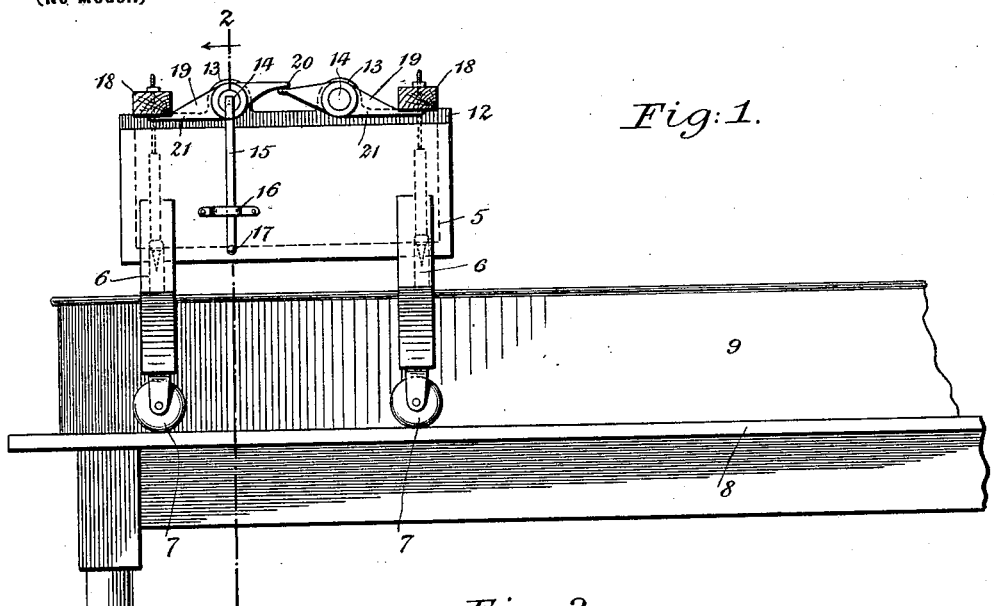

No. 679,064. Patented July 23, 1901.
R. R. STONE.
BOTTLE FILLING MACHINE.
(Application filed Nov. 23, 1900.)
(No Model.)

WITNESSES
INVENTOR
Reuben R. Stone
BY
Edgar Yates
ATTORNEYS

THE NORRIS PETERS CO., PHOTO-LITHO., WASHINGTON, D. C.

UNITED STATES PATENT OFFICE.

REUBEN R. STONE, OF NEW YORK, N. Y.

BOTTLE-FILLING MACHINE.

SPECIFICATION forming part of Letters Patent No. 679,064, dated July 23, 1901.

Application filed November 23, 1900. Serial No. 37,556. (No model.)

*To all whom it may concern:*

Be it known that I, REUBEN R. STONE, a citizen of the United States, residing at New York, in the county of New York and State of New York, have invented certain new and useful Improvements in Bottle-Filling Machines, of which the following is a full and complete specification, such as will enable those skilled in the art to which it appertains to make and use the same.

This invention relates to bottle-filling machines; and the object thereof is to provide an improved machine of this class which is simple in construction and operation and which is particularly designed for fillling bottles with milk, but which may be used for the purpose of filling bottles with any liquid.

The invention is an improvement on that described and claimed in United States Letters Patent No. 339,709, granted to me April 13, 1886, and is fully disclosed in the following specification, of which the accompanying drawings form a part, in which the separate parts of my improvement are designated by the same reference characters in each of the views, and in which—

Figure 2:
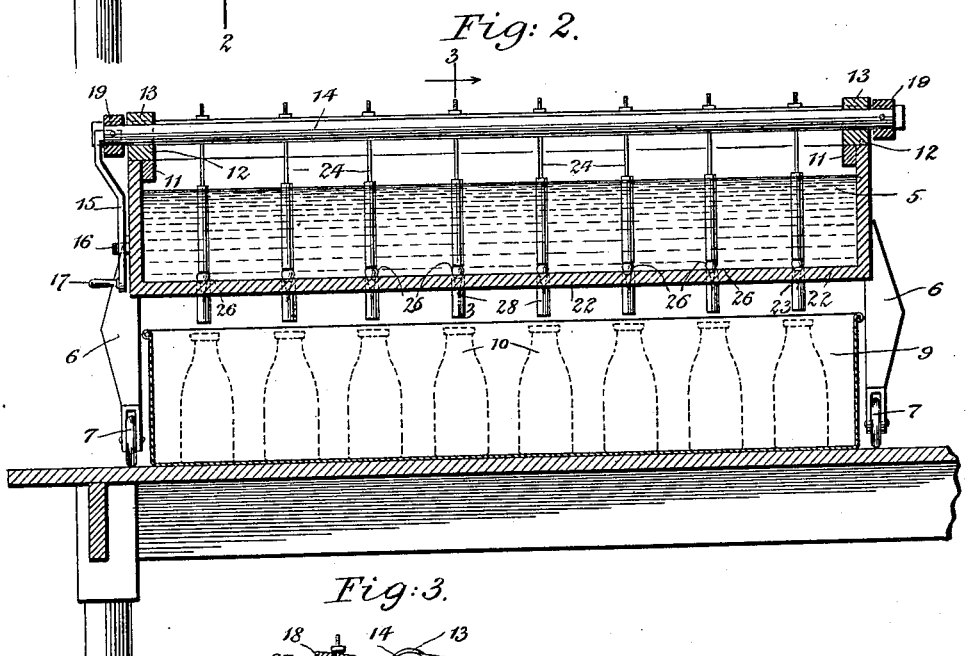

Figure 1 is a side elevation of my improved apparatus or machine; Fig. 2, a section on the line 2 2 of Fig. 1, and Fig. 3 a partial section on the line 3 3 of Fig. 2 and showing the parts in a different position.

In the practice of my invention I provide a tank or receptacle 5, which is preferably rectangular and oblong in form and which is provided at its opposite ends with hangers 6, in the lower ends of which are mounted wheels or rollers 7, and said tank or receptacle 5 is in practice mounted on a table or support 8, on which is placed a bottle-receiving tank 9, in which the bottles to be filled are placed, as shown in dotted lines at 10 in Fig. 2.

The tank or receptacle 5 is preferably provided at each end with a transverse reinforcing-strip 11, and mounted on and secured to each end of said tank or receptacle is a transverse bar 12, having vertically-arranged bearings 13, and mounted in the bearings 13 are two horizontal and longitudinal shafts 14, with one of which is connected a crank-arm 15, which extends downwardly across the corresponding end of the tank or receptacle 5 and passes through a horizontal keeper 16 and is provided at its lower end with a handle 17.

Placed horizontally of the tank or receptacle 5, on the top thereof and parallel with the shafts 14, are two bars 18, and the shafts 14 are provided at each end with a cross-head 19, each of which is provided with an inwardly and upwardly directed arm 20 and with an outwardly and downwardly directed arm 21. The inwardly and outwardly directed arms 20 of the cross-heads 19 overlap each other, as clearly shown in Fig. 1, while the outwardly and downwardly directed arms 21 pass beneath the corresponding ends of the bars 18, as is also shown in said figure, and by reason of this construction it will be apparent that by swinging the crank-arm 15 to the left of the position shown in Fig. 1 the bars 18 will be slightly raised above the tank or receptacle 5, and when said crank-arm is returned to its vertical position the said bars 18 will also return to the position shown in Fig. 1 and will rest on the tank or receptacle 5.

Figure 3:
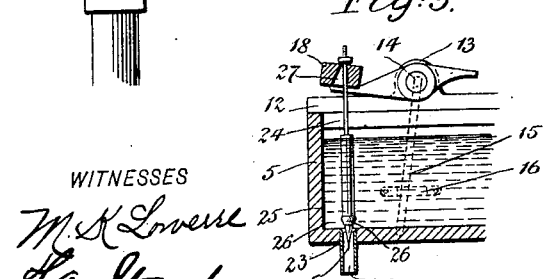

The bottom 22 of the tank or receptacle 5 is provided directly under each of the bars 18 with a longitudinal row of valve-openings 23, which, as shown in the drawings, are eight in number, and each of said shafts 14 is also provided with a corresponding number of valve-rods 24, each of which is provided at its lower end with a conical or pivoted valve 25, each of which is provided at its upper end with a spherical portion having a rubber or other covering 26, which serves to make a more secure closure of the openings 26, and when the bars 18 are in the position shown in Figs. 1 and 2 the valve-openings 23 will be closed, as will be readily understood. When the valve-rods are raised, as shown in Fig. 3, the valve-openings 23 will be opened and the milk or other liquid will be free to flow therethrough.

It will be understood that the milk or other liquid with which the bottles are to be filled is placed in the tank or receptacle 5, and the bottles 10 are arranged in the bottle-tank 9, as indicated in dotted lines in Fig. 2 and as hereinbefore described, and by turning the crank-arm 15 to the left the bars 18 will be slightly raised and the contents of the tank or receptacle 5 will flow into the bottles 10, as will be readily understood. The holes 27 in the bars 18, through which the valve-rods 24 pass, are larger at the bottom than at the top, as shown in Fig. 3, and the valve-rods 24 swing freely from said bars, and in the operation of the machine, as hereinbefore described, said valve-rods are never raised high enough to remove the valves 25 entirely from the valve-openings 23, and the movement of the crank-arm 15 to the left is limited by the keeper 16. This apparatus is simple in construction and operation and is perfectly adapted to accomplish the result for which it is intended, while being also comparatively inexpensive, and by means thereof I provide simple and effective apparatus for filling bottles with milk or other liquids in great numbers and in a comparatively short space of time, for by means of my invention I may manipulate the valves for filling two or more rows of bottles with exactly the same labor as hitherto has been required for filling one row, and yet, moreover, I accomplish this in a more effective manner.

The valves 25 are virtually needle-valves, and by means thereof the valve-openings 23 are securely closed when the apparatus is not in operation, and I also prefer to secure in said valve-openings short tubes 28, which will also project below the bottom of the tank or receptacle 5 and direct the milk or other liquid into the bottles, as is done in the patent hereinbefore referred to.

Having fully described my invention, what I claim as new, and desire to secure by Letters Patent, is—

1. In an apparatus of the class described, a tank or receptacle provided in the bottom thereof with longitudinal valve-openings, vertically-movable bars placed on said tank or receptacle and provided with valve-rods and valves for closing said openings, and means for moving said bars vertically, consisting of longitudinal shafts placed between said arms and provided at their opposite ends with cross-heads having inwardly-directed arms which overlap each other and outwardly-directed arms which extend beneath said bars, one of said shafts being provided at its end with a crank-arm, substantially as shown and described.

2. In an apparatus of the class described, a tank or receptacle provided with longitudinal shafts mounted in the top thereof one of which is provided with means for turning it, said shafts being provided at their opposite ends with cross-heads having inwardly-directed arms which overlap each other, said tank or receptacle being also provided in the bottom thereof with valve-openings, and devices operated by said cross-heads for closing said valve-openings, substantially as shown and described.

In testimony that I claim the foregoing as my invention I have signed my name, in presence of the subscribing witnesses, this 21st day of November, 1900.

REUBEN R. STONE.

Witnesses:
F. A. STEWART,
M. K. LOWERRE.